United States Patent [19]

Billet

[11] Patent Number: 4,616,741
[45] Date of Patent: Oct. 14, 1986

[54] CLUTCH COVER ASSEMBLY

[75] Inventor: René Billet, Allée des Cerfs Résidence Beaularris, 60620 Lamorlaye, France

[73] Assignee: Valeo, Paris, France

[21] Appl. No.: 732,572

[22] Filed: May 10, 1985

[30] Foreign Application Priority Data

May 15, 1984 [FR] France .............................. 84 07468

[51] Int. Cl.$^4$ ...................... F16D 13/50; F16D 13/71
[52] U.S. Cl. .............................. 192/70.18; 192/70.27; 192/89 B; 192/DIG. 1
[58] Field of Search ............... 192/70.18, 70.27, 70.28, 192/89 B, 109 R, 70.13, DIG. 1; 29/434, 526

[56] References Cited

U.S. PATENT DOCUMENTS

| | | | |
|---|---|---|---|
| 2,047,737 | 7/1936 | Lane | 192/70.27 |
| 2,232,848 | 2/1941 | Geyer . | |
| 2,248,378 | 7/1941 | Nutt . | |
| 2,253,344 | 8/1941 | Nutt et al. | 192/70.18 |
| 3,489,256 | 1/1970 | Binder et al. | 192/70.18 |
| 4,558,771 | 12/1985 | Després | 192/89 B |

FOREIGN PATENT DOCUMENTS 2381938 9/1978 France .
1577243 10/1980 United Kingdom .

Primary Examiner—Rodney H. Bonck
Assistant Examiner—Alan G. Towner
Attorney, Agent, or Firm—Charles E. Brown; Charles A. Brown

[57] ABSTRACT

A clutch cover assembly comprises an annular cover attached to a reaction plate, an annular pressure plate rotationally coupled to and axially movable relative to the cover and axially acting elastic means bearing on the cover and continuously urging the pressure plate away from the cover. The cover is circumferentially divided into separate sectors. Means are provided whereby one of the sectors overlap another. For each sector, the overlap means comprise at least overlap lug constituting an extension of the sector in one circumferential sense. This is at least locally superposed on and attached to the immediately adjacent sector in the aforementioned circumferential sense.

14 Claims, 15 Drawing Figures

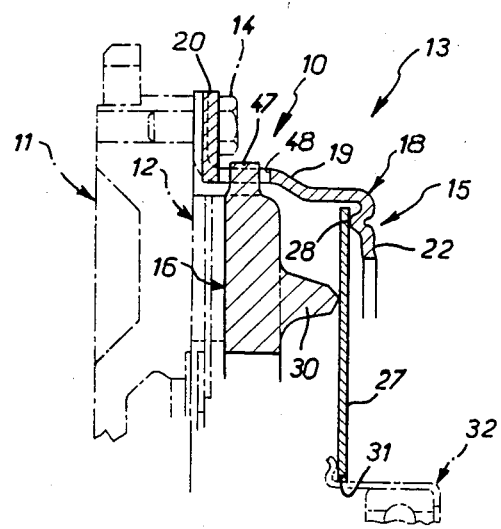
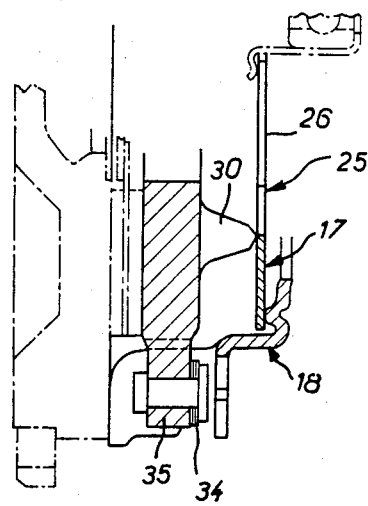
FIG.1

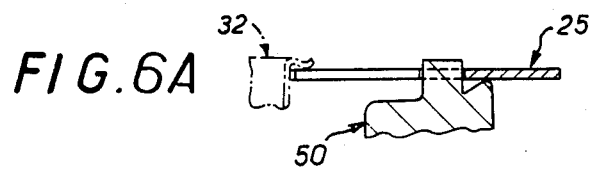
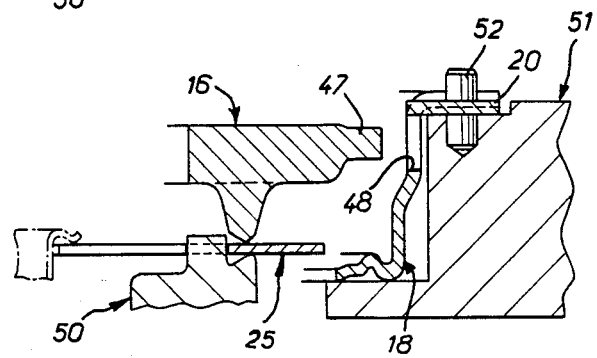
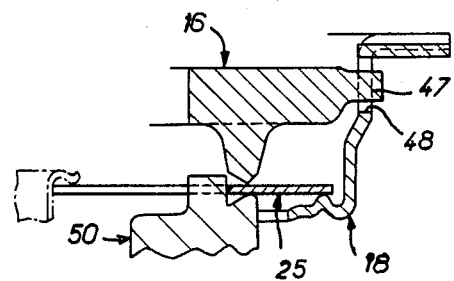
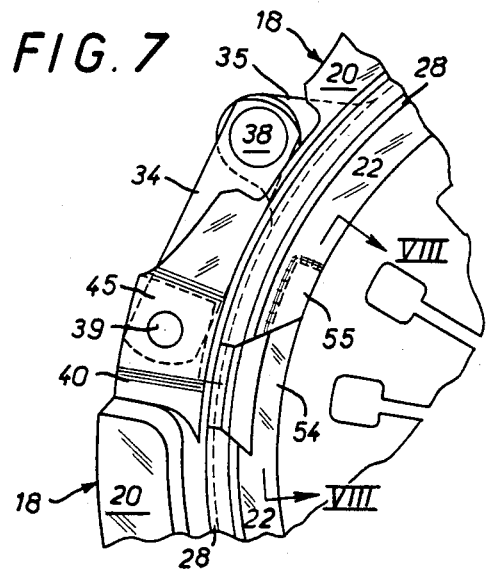
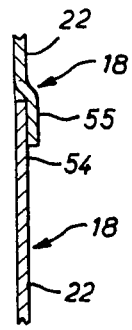

CLUTCH COVER ASSEMBLY

BACKGROUND OF THE INVENTION

1. Field of the invention

The present invention is generally concerned with clutches, for automobile vehicles in particular, and is more particularly directed to the assembly of parts, commonly called the clutch cover assembly, to be mounted on a reaction plate or flywheel with a friction disk inserted between them in order to constitute a clutch of this kind.

2. Description of the prior art

Generally speaking, a clutch cover assembly of this kind comprises a first annular part, called the cover, through the intermediary of which it is adapted to be attached to the reaction plate or flywheel to be equipped, a second annular part, called the pressure plate, which is mounted so as to be axially mobile relative to the cover whilst being rotationally coupled to the latter, and axially acting elastic means which, bearing on said cover, continuously urge the pressure plate away from the latter, in order to clamp up the friction disk present between the pressure plate and the reaction plate.

More often than not the cover is of unitary construction, being formed in one piece from a sheet metal blank appropriately cut out and stamped.

It features, disposed at respective ends of an axial part or skirt, on the one hand a first transverse part or rim which is directed radially away from the axis of the assembly and through the intermediary of which it is adapted to bear on the reaction plate to be equipped and, on the other hand, a second transverse part or back which is radially directed towards said axis and through the intermediary of which it is adapted to provide a bearing support for the associated axially acting elastic means.

More often than not the radial extent of this back, the central opening in which defines the internal periphery of the cover, is relatively small, in particular in the case of so-called "pull" type clutches, in which the axially acting elastic means bear on a back of this kind in the immediate vicinity of the axial part or skirt which flanks the latter.

As a result, when a cover of this kind is cut out there is a non-negligible central waste part which may amount to more than half the total weight and which, since more often than not it is not easily recoverable for use, significantly adds to the cost of the assembly.

To minimize this disadvantage it is proposed in U.S. Pat. No. 2,248,378 to divide the cover circumferentially into distinct sectors.

However, failing further provisions, an arrangement of this kind implies that these sectors must be individually attached to the reaction plate to be equipped and therefore that it is necessary to assemble the clutch cover assembly on the reaction plate, without it being possible to assemble the clutch cover assembly as a unit beforehand, which complicates the operation and which is incompatible with at least certain applications in which the reaction plate on the one hand and the clutch cover assembly on the other hand originate from different manufacturers.

In French patent application No. 78 05218 filed Feb. 23, 1978 and published under the No. 2 381 938, there is proposed a structure in which the transverse part forming the back of the cover is subdivided into distinct sectors, the associated axial part resulting from the circular closure upon itself of a strip of sheet metal in one piece.

An arrangement of this kind, by attaching to this axial part the sectors designed to form a back, provides for a unitary cover construction and enables a clutch cover assembly to be produced as a unit which can be handled in isolation before it is mounted on a reaction plate.

However, it does not draw maximum benefit from the subdivision adopted, since this affects only part of the cover.

Furthermore, in both cases there is in service no link between the sectors concerned other than that established between other component parts of the clutch of which it constitutes part.

In other words, in both cases, there is no circumferential continuity between these sectors in service.

Given the moment arm which exists between, on the one hand, the point at which they bear on the reaction plate and, on the other hand, the point at which the associated axially acting elastic means bear on them, they may be subject to distortion which, tending to move them away from the axis of the assembly, is prejudicial to the correct operation of the latter.

A general object of the present invention is an arrangement providing a very simple way of avoiding this disadvantage, combining the advantages of a saving in materials with those of unitary construction, and also conferring further advantages.

SUMMARY OF THE INVENTION

In one aspect, the present invention consists in a clutch cover assembly comprising an annular cover adapted to be attached to a reaction plate, an annular pressure plate rotationally coupled to said cover and movable axially relative to said cover, and axially acting elastic means bearing on said cover and continuously urging said pressure plate away from said cover, wherein said cover is circumferentially divided into separate sectors and means are provided whereby said sectors overlap.

For example, for each of the sectors, the overlap means may comprise at least one overlap lug constituting an extension of the sector in one circumferential sense and at least locally superposed on and attached to the immediately adjacent sector in the aforementioned circumferential sense.

Be this as it may, by virtue of the overlap means thus employed between the sectors constituting the cover, the circumferential continuity of the cover is advantageously restored despite its subdivision into sectors of this kind, with the result that the clutch cover assembly in accordance with the invention inherently features excellent cohesion at every point compatible with the requirements of handling operations necessary to mounting it on a reaction plate, and all risk of unwanted distortion of the cover in service is eliminated.

Furthermore, although the thus implemented clutch cover assembly may be assembled in the conventional manner, with the circumferential continuity of its cover restored beforehand, the arrangement in accordance with the invention advantageously lends itself to an assembly process which overcomes in a very simple manner the problem of securing the usual axial abutment to limit the no-load travel of the pressure plate when acted on by the associated axially acting elastic means during storage.

As is well known, various means have been proposed for providing such axial abutment.

One of the simplest consists in providing spaced and radially projecting tabs on the outside periphery of the pressure plate, respectively engaged in openings provided for this purpose in the axial part of the cover.

There is then the problem, at the assembly stage, of engaging these tabs in these openings.

This may result either in the necessity to offer up the pressure plate at a slant relative to the cover before it is straightened up transversely relative to the latter, or in the need for a bayonet coupling.

In either case, the assembly is complicated as a result of this.

In another aspect, the invention consists in a method of assembling a clutch cover assembly of this kind in which said sectors constituting said cover are individually moved radially nearer said pressure plate prior to final assembly of the clutch cover assembly.

As a result, every sector is very simply engaged on the corresponding tab of the pressure plate in one movement.

No operation specific to this end is therefore required, which is advantageously favorable to the overall economy of the process.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 1 is a view in axial cross-section of a clutch cover assembly in accordance with the invention.

FIGS. 6A, 6B and 6C are partial views in axial cross-section showing various successive phases of an assembly process for the clutch cover assembly in accordance with the invention.

FIG. 7 is a partial plan view analogous to that of FIG. 2 and relating to an alternative embodiment.

FIG. 8 is a partial view of this alternative embodiment in circumferential cross-section on the line VIII—VIII in FIG. 7, developed in the flat.

DESCRIPTION OF THE PREFERRED EMBODIMENTS

Figure 2:
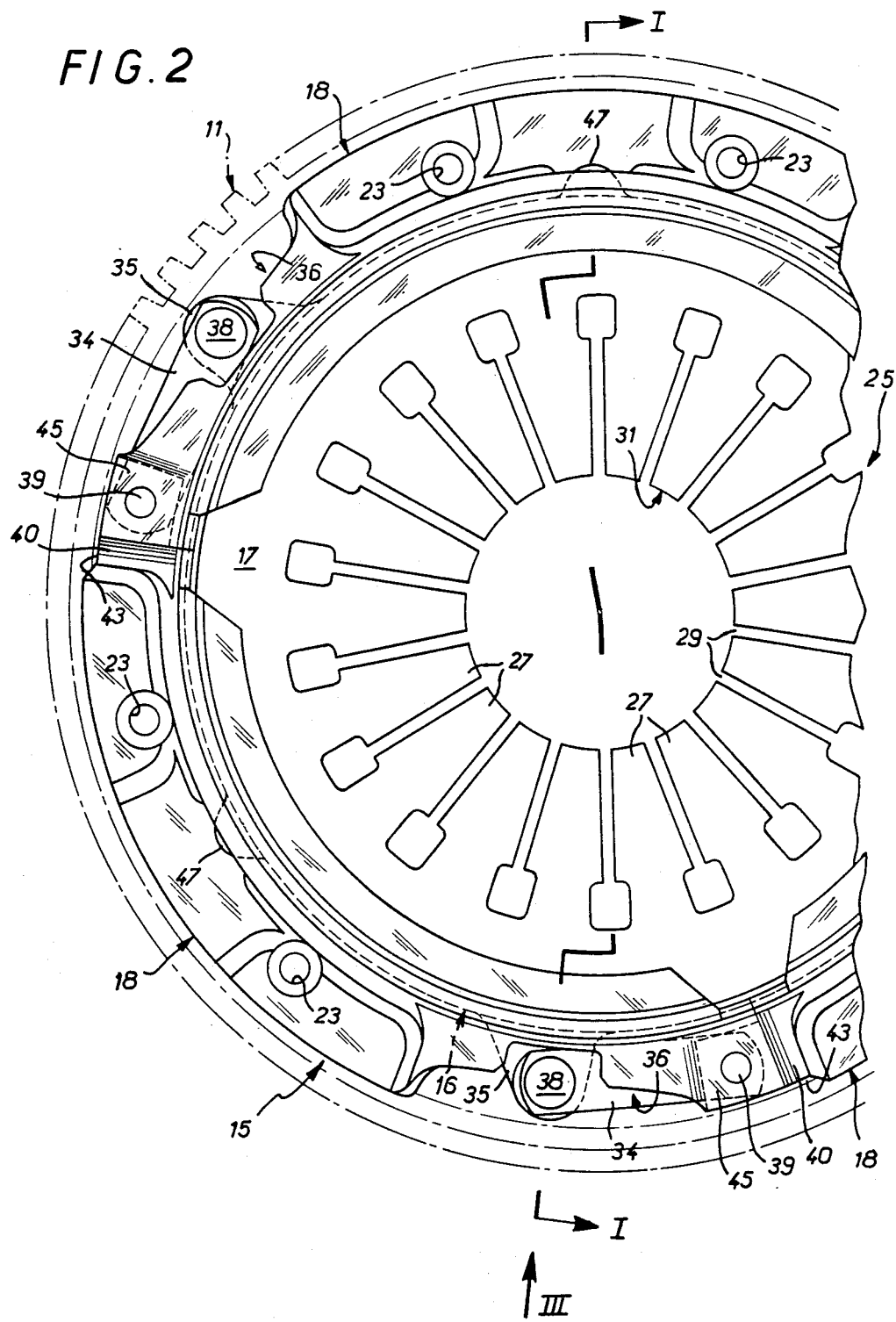
FIG. 2 is a partial plan view of it in the direction of the arrow II in FIG. 1.
Figure 3:
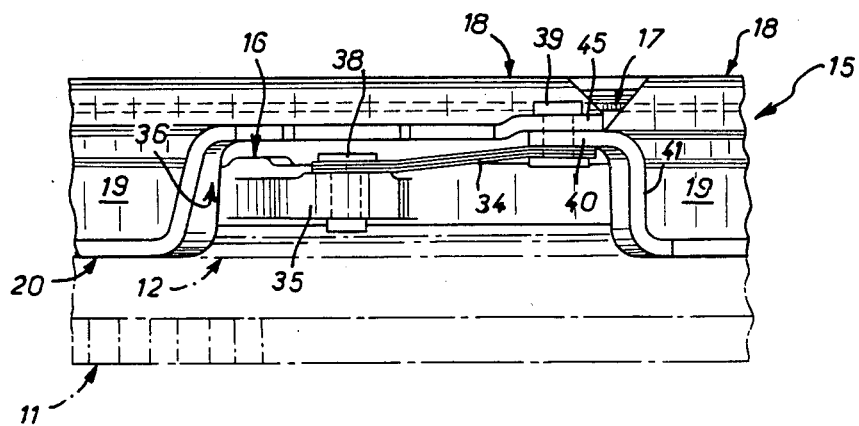
FIG. 3 is a partial view of it in elevation in the direction of the arrow III in FIG. 2.
Figure 4:
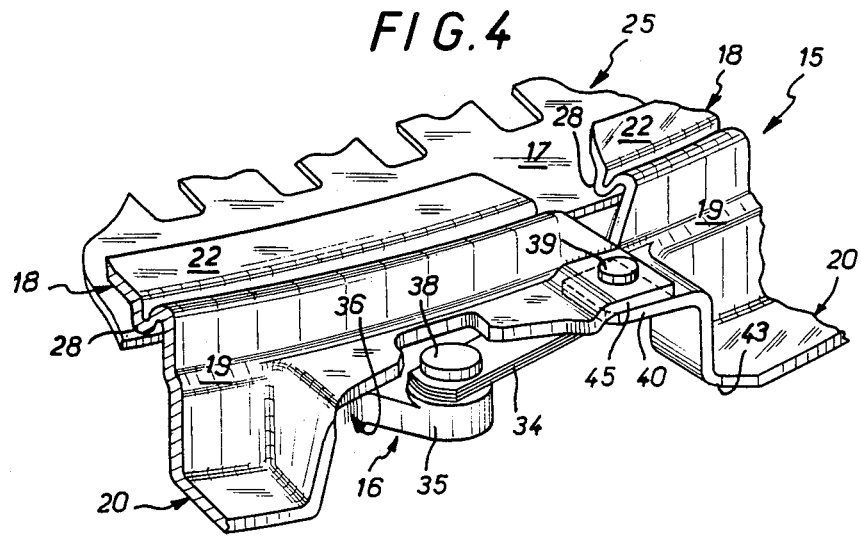
FIG. 4 is a partial view of it in perspective corresponding to FIG. 3.

These figures show by way of example the application of the invention to a clutch 10 of the "pull" type, that is to say a clutch to which traction is applied in order to disengage it.

Generally speaking, a clutch 10 of this kind which is intended to equip an automobile vehicle comprises a plate 11, called the reaction plate or flywheel, which is designed to be constrained to rotate with a first shaft, in practice the output shaft of the motor of an automobile vehicle, a friction disk 12 which is designed to be constrained to rotate with a second shaft, in practice the input shaft of the gearbox of said automobile vehicle, and a clutch cover assembly 13 which is attached to the reaction plate 11 around the friction disk 12, for example by set screws 14 at its periphery.

As only the clutch cover assembly 13 is relevant in this context, it alone is shown in full line in the figures, the other constituent parts of the clutch 10 being shown only schematically in chain-dotted lines, if at all.

In a manner which is known per se, the clutch cover assembly 13 generally comprises a first annular part 15, called the cover, through the intermediary of which it is adapted to be attached to the reaction plate 11, a second annular part 16, called the pressure plate, which is mounted so as to be axially mobile relative to the cover 15 whilst being rotationally coupled to the latter, and axially acting elastic means 17 which bear on the cover 15 and continuously urge the pressure plate 16 away from the latter, so continuously urging the pressure plate 16 towards the reaction plate 11, in order to clamp up the friction disk 12 present between said pressure plate 16 and said reaction plate 11.

In a manner known per se, the cover 15 is overall circumferentially divided into distinct sectors 18, each of these sectors 18 featuring, on the one hand, a generally axial part 19 and, on the other hand, disposed at respective axial ends of this axial part 19, two transverse parts consisting of a first transverse part 20 or rim, which is directed radially away from the axis of the assembly and through the intermediary of which it is adapted to be attached to the reaction plate 11, and a second transverse part 22, or back, which is directed radially towards the axis of the assembly and through which it is adapted to provide a bearing support for the associated axially acting elastic means 17.

In practice, in the embodiments shown, there are provided in this way three sectors 18 regularly distributed around the axis of the assembly and together constituting the cover 15.

The radial rim 20 of each of them comprises two spaced holes 23 each adapted to have a screw 14 pass through it.

In the embodiments shown, the associated axially acting elastic means 17 consist of the peripheral part, forming a Belleville spring, of a third annular part 25 called the diaphragm spring, the central part 26 of which is circumferentially divided into radial fingers 27 by slots 29.

This diaphragm spring 25 bears axially on the cover 15, more precisely on the back 22 of the sectors 18 constituting the latter, said back 22 featuring a circumferential half-wave deformation 28 forming a bead adapted to provide a bearing support, projecting axially towards said diaphragm spring 25 along a circumference of the same diameter on each sector 18.

The diaphragm spring 25 conjointly bears axially on the pressure plate 16 which features a circumferential series of bosses 30 axially projecting towards said diaphragm spring 25 and adapted to have the diaphragm spring 25 act on them.

As it is to equip a pull type clutch 10, the diameter of the circumference along which extend the half-wave deformations 28 in the sectors 18 constituting the back 22 of the cover 15 is greater than that of the circumference along which extend the bosses 30 on the pressure plate 16.

Furthermore, and as schematically represented in chain-dotted lines in FIG. 1, there is then attached to the diaphragm spring 25, by means of the central openings 31 therein, a clutch release bearing 32 adapted to function in traction, that is to say in the direction away from the reaction plate 11, in the direction of the arrow F in FIG. 1.

In a manner also known per se, in order to couple it in rotation to the cover 15 the pressure plate 16 is linked to said cover 15 by elastically deformable strips 34 which are disposed generally transversely and which, in the embodiments shown, all extend substantially tangentially to a common circumference of the assembly.

These elastically deformable strips 34 are operative individually or in groups.

In the embodiment shown, three groups of elastically deformable strips 34 are provided in this way, one for each sector 18 of the cover 15.

The pressure plate 16 features circumferentially spaced radially projecting lugs 35 at its outside periphery for the strips to act on and which, in the embodiment shown, are therefore three in number and, conjointly, for these lugs 35 to pass through, the rim 20 of each of the sectors 18 of the cover 15 forms a louver by virtue of which it is locally spaced from the reaction plate 11 in the axial direction.

In the embodiment specifically shown in FIGS. 1 through 4, this louver 36 is implemented at one of the circumferential ends of the sectors 18, being formed in part by one such sector and in part by the immediately adjacent sector, and the elastically deformable strips 34 are attached to the side of the pressure plate 16 opposite the reaction plate 11.

At one end the elastically deformable strips 34 of the same group are fastened by fixing means 38, in this instance a rivet, to the relevant lug 35 of the pressure plate 16. At their other end they are fastened by fixing means 39, also a rivet in this instance, to a land on the corresponding louver 36.

These arrangements are well known per se and as they do not constitute part of the present invention they will not be described in more detail here.

Likewise, the other constitutent parts of the clutch 10 will not be described here.

In accordance with the invention, the cover 15 being circumferentially divided into distinct sectors 18, as described hereinabove, means are provided whereby these sectors 18 overlap.

In practice, for each sector 18 these overlap means comprise at least one overlap lug 40 which, constituting an extension of the sector 18 in one circumferential sense, is at least locally superposed on and attached to the sector 18 which follows immediately on from it in the circumferential sense concerned.

In the embodiments specifically shown in FIGS. 1 through 4, the overlap lug 40 thus associated with each sector 18 of the cover constitutes a circumferential extension of the rim 20 of a sector 18 and is in one piece with the latter.

In practice, in these embodiments, an overlap lug 40 of this kind is operative at one circumferential end of the louver 36 provided for the corresponding radial lug 35 of the pressure plate 16 to pass through and projects cantilever-fashion from the sector 18 which it extends, more precisely from a portion 41 of the rim 20 of the latter which, substantially at right angles or oblique to its main part, constitutes part of said louver 36.

In the embodiment specifically shown in FIGS. 1 through 4, the edges of the overlap lug 40 are bare.

Figure 5:
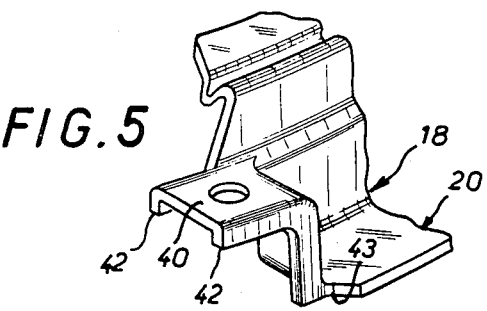
FIG. 5 is a view in perspective corresponding to part of FIG. 4 and relating to an alternative embodiment.

As an alternative (FIG. 5) and for purposes of increased stiffness, at least one of these edges, and in practice each of them in the embodiment shown, is bordered by a flange 42.

For at least that of the edges in question which is the radially outermost, this flanged edge 42 is of relatively restricted height.

In order not to increase the overall contour of the initial blank from which a sector 18 is cut out, it is preferably formed in conjunction with a notch 43 formed locally in the rim 20 of the latter.

Be this as it may, the overlap lug 40 of the immediately adjacent sector 18 is superposed on and attached to a portion 45 of the louver 36 that the rim 20 of a sector forms locally in the embodiments shown in FIGS. 1 through 5.

In practice, for the necessary overlapping to be obtained, the relevent part 45 of this louver 36 is axially offset relative to its main part, in the direction towards the associated back 22.

The corresponding axial offset is equal to at least a fraction of the thickness of the initial blank, as shown, or even to the total thickness if the overlap lug 40 of each sector 18 is aligned with the main part of its louver 36.

In all cases, this overlap lug forms an extension of the rim 20 from which it projects cantilever fashion.

For preference, and as shown, the edge of the axial part 19 and the back part 22 of a sector 18 extends obliquely inboard of the overlap lug 40 and the same applies to the edge inboard of the portion 45 of each louver 36.

As a result the thus oblique edges of the axial part 19 and the back part 22 of these sectors 18 extend generally away from one another in a V-shape and their half-wave deformations 28 are consequently offset circumferentially relative to one another.

The consequences of possible tolerances with regard to the level of these half-wave deformations 28 on the bearing support that they provide for the diaphragm spring 25 are in this way advantageously minimized.

In the embodiments shown in FIGS. 1 through 5, the same fixing means, in this instance the rivet 39, fastens to each sector 18 of the cover 15 not only the corresponding deformable strip 34, but also the overlap lug 40 of the immediately adjacent sector 18.

In these embodiments, the overlap between sectors 18 occurs at the level of the fastening of the elastically deformable strips 34, which advantageously enables the number of rivets used to fasten the assembly together to be minimized.

Finally, in the embodiments shown in FIGS. 1 through 5, the pressure plate 16 features circumferentially spaced tabs 47 radially projecting from its edge at its outside periphery, one per sector 18 of the cover 15, and each sector 18 of the cover 15 features a corresponding opening 48 adapted for radial engagement over a tab 47.

As it is easy to understand, and in a manner known per se, tabs 47 of this kind constitute for the pressure plate 16 axial abutment means limiting its no-load travel in storage, said tabs 47 then coming into axial bearing engagement against the corresponding transverse edge of the openings 48 in which they are engaged, formed in this instance in the rim 20 of the corresponding sectors 18.

The clutch cover assembly 13 in accordance with the invention is assembled prior to its mounting as a unit assembly onto the reaction plate 11 to be equipped.

This assembly may be carried out in the following manner, for example.

As shown in FIG. 6A, and possibly already equipped with the clutch release bearing 32, as represented schematically in FIG. 6A in chain-dotted line, the diaphragm spring 25 is first placed on a support 50, on that of its sides intended subsequently to bear axially on the sectors 18 of the cover 15.

The pressure plate 16, to which the elastically deformable strips 34 have previously been attached, is in turn placed on the diaphragm spring 25, as shown in FIG. 6B, in which the elastically deformable strips 34 are not yet visible.

The sectors 18 constituting the cover 15 are then moved individually radially closer to the pressure plate 16.

As shown in FIG. 6B in the case of one of them, to this end each may be placed on a sliding member 51 which is radially mobile relative to the support 15, being locked to this sliding member 51 by pins 52 passing through the openings 23 in their rim 20.

During such radial movement of each of the sectors 18 of the cover 15 towards the pressure plate 16, the sector 18 of itself, by means of its opening 48 and without any specific operation to this end being required, becomes engaged on the corresponding tab 47 of said pressure plate 16, as shown in FIG. 6C.

Finally, it is merely necessary to carry out the final fastening together of the assembly, by fixing to the sectors 18 of the cover 15 thus positioned the elastically deformable strips 34 carried by the pressure plate 16, this same operation conjointly ensuring, as described hereinabove, the fastening together of said sectors 18.

As will be noted, the tabs 47 of the pressure plate 16, circumferentially offset from the overlap between successive sectors 18 of the cover 15, advantageously contribute to the achieving of good cohesion of the clutch cover assembly 13 in accordance with the invention while in storage.

In the alternative embodiment shown in FIGS. 7 and 8, with an overlap lug 40 there is associated at least one additional overlap lug 54 which, operative between transverse parts of two successive sectors 18, simply bears axially against one of the latter.

For example, and as shown here, the back 22 of each sector 18 may comprise, on the same circumferential side as the corresponding overlap lug 40, but on the opposite radial side of the latter relative to the half-wave deformation 28 which it comprises, a circumferential extension forming the additional overlap lug 54 in question.

Conjointly, the portion 55 of a back 22 of this kind which, disposed at the other circumferential end of the latter, is designed to cooperate with the additional overlap lug 54 of the adjacent sector 18, is offset axially in the direction away from the associated rim 20, to overlap said additional overlap lug 54.

The addition overlap lugs 54 which the sectors 18 constituting the cover 15 thus feature advantageously strengthen the latter before the assembly is mounted on the reaction plate 11.

Figure 9:
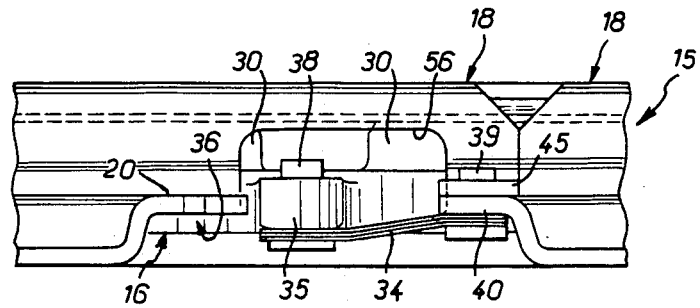
FIGS. 9 through 11 are partial views in elevation analogous to that of FIG. 3 and each relating to a respective further embodiment.

The alternative embodiment shown in FIG. 9 is distinguished from the preceding embodiments only by virtue of the fact that the elastically deformable strips 34 are operative not on the side of the pressure plate 16 opposite the reaction plate 11, but on the side of the pressure plate 16 facing said reaction plate 11.

Conjointly, to permit the passage of the corresponding lug 35 of this pressure plate 16, the axial part 19 of each sector 18 of the cover 15 comprises, in line with the median part of its louver 36, a notch 56 which also extends into its rim 20.

A notable advantage of this arrangement is the reduction in the axial dimension of the louver 36.

Moreover, at the assembly stage, it enables the elastically deformable strips 34 to be fastened on as a final assembly operation, the same riveting operation then serving to attach the strips 34 to the pressure plate 16 and to the sectors 18 of the cover 15.

In other words, in this case there is no need to previously rivet the elastically deformable strips 34 to the pressure plate 16.

Figure 10:
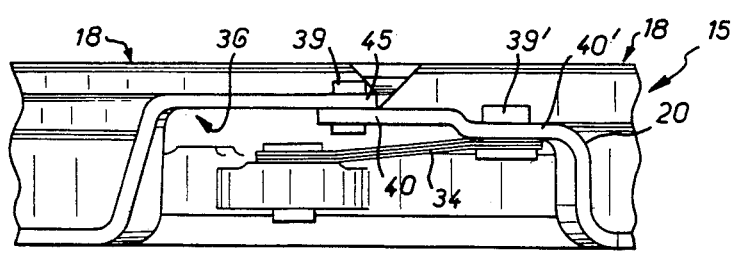
Figure 11:
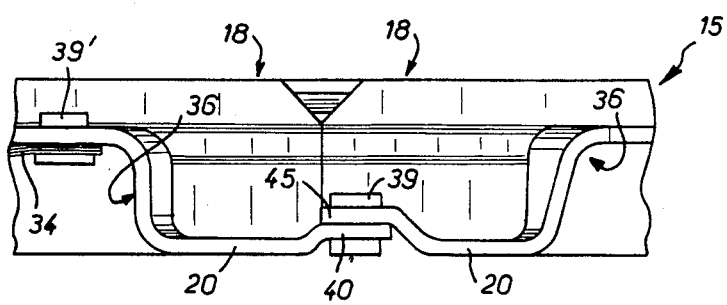
Figure 12:
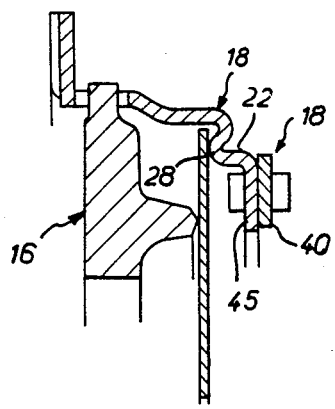
FIG. 12 is a partial view in axial cross-section analogous to that of FIG. 1 and relating to another embodiment.

In the embodiments of FIGS. 10 through 12, there is a distinction between, on the one hand, the attachment in pairs of the sectors 18 of the cover 15 by means of their overlap lugs 40 and, on the other hand, the attachment of the elastically deformable strips 34 to the sectors 18.

In the embodiment of FIG. 10, the rim 20 of each sector 18 forms two louvers 36 and 36' which, disposed at its respective ends, complement each other on adjacent sectors 18, and it is a portion 45 of the louver 36 of a sector 18 over which is locally superposed and to which is attached to the overlap lug 40 of the immediately adjacent sector 18, whereas it is a land 40' of the louver 36' of the latter to which are fastened the corresponding elastically deformable strips 34.

Two distinct fixing means are then employed, one (39) for fastening the overlap lug 40 to the relevant portion 45 of the louver 36 and the other (39') for fastening the elastically deformable strips 34 to the portion 40' of the louver 36' complementing the preceding louver.

In the embodiment shown in FIG. 11, each sector 18 comprises only one louver 36, formed unitary fashion by its rim 20 at a distance from both its circumferential ends, and it is at a location offset from a louver 36 of this kind that a sector 18 of this kind overlaps the immediately adjacent sector 18.

In practice, in this embodiment, it is the portion 45 of the rim 20 of a sector 18 over which is locally superposed and to which is attached by a rivet 39 the corresponding overlap lug 40 of the immediately adjacent sector 18.

As previously, V-shaped oblique edges are formed between successive bearing sectors 18 for appropriate circumferential offsetting, one relative to the other, of their half-wave deformations 28.

In the embodiment shown in FIG. 12, it is the portion 45 of the back 22 of a sector 18 over which is locally superposed the overlap lug 40 of the immediately adjacent sector 18, said portion 45 being offset radially towards the axis of the assembly and axially away from the pressure plate 16, relative to the corresponding half-wave deformation 28.

Figure 13:
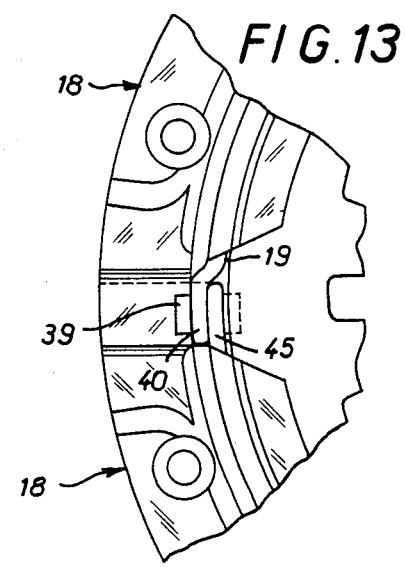
FIG. 13 is a partial plan view analogous to that of FIG. 2 and also relating to a further embodiment.

Finally, in the embodiment shown in FIG. 13, the overlap lug 40 of one sector 18 of the cover 15 constitutes a circumferential extension of the axial part 19 of the latter, this overlap lug 40 being locally superposed over and fastened by a rivet 39 to a portion 45 of the axial part 19 of the immediately adjacent sector 18.

In practice, in the embodiment shown, this portion itself constitutes a circumferential extension of the axial part 19 of the latter.

It will be understood that various changes in the details, materials and arrangement of parts which have been herein described and illustrated in order to explain the nature of the invention may be made by those skilled in the art within the principle and scope of the invention as expressed in the appended claims.

For example, an overlap lug may be attached to the portion of the adjacent sector that it overlaps by welding, for example.

Also, an overlap lug of this kind may be extended, console-fashion, to constitute an axial abutment for the pressure plate by providing an axial bearing member for the corresponding elastically deformable strips.

Similarly, in order to constitute an axial abutment member of this kind, the lugs on the pressure plate may be replaced by cut-outs cooperating with lugs formed on the segments constituting the cover.

Furthermore, it goes without saying that the scope of the invention is not exceeded by separating the overlap lugs employed from the sectors which they extend, that is to say by artificially forming these overlap lugs by means of members which, initially separate from the sectors, are subsequently and conveniently attached and fixed to the latter, by welding or riveting, for example.

Also, the number of sectors used in immaterial.

Finally, although the present invention has been specifically described with reference to a pull type clutch, it goes without saying that it is equally applicable to a push type clutch, that is to say a clutch in which, in order to disengage the clutch, the corresponding clutch release bearing is pushed in.

There is claimed:

1. Clutch cover assembly comprising an annular cover adapted to be attached to a reaction plate, an annular pressure plate rotationally coupled to said cover and movable axially relative to said cover, and axially acting elastic means bearing on said cover and continuously urging said pressure plate away from said cover, wherein said cover is circumferentially divided into separate sectors and means are provided whereby said sectors overlap.

2. Clutch cover assembly according to claim 1, wherein, for each of said sectors, said overlap means comprise at least one overlap lug constituting an extension of said sector in one circumferential sense and at least locally superposed on and attached to the immediately adjacent sector in the aforementioned circumferential sense.

3. Clutch cover assembly according to claim 2, wherein each of said sectors comprises a transverse part of which said overlap lug constitutes an extension.

4. Clutch cover assembly according to claim 3, further comprising elastically deformable strips whereby said pressure plate is coupled to said cover and respective fixing means whereby said elastically deformable strips are attached to one of said sectors of said cover at one end, individually or in groups, said fixing means also attaching to said one sector said overlap lug of the immediately adjacent sector.

5. Clutch cover assembly according to claim 4, wherein said pressure plate features circumferentially spaced lugs projecting radially from its outside periphery to which said elastically deformable strips are attached and a sector features a radial rim through which it bears on said reaction plate, said radial rim featuring a louver for a respective one of said lugs of said pressure plate to pass through and said overlap lug of said immediately adjacent sector overlapping and being attached to part of said louver.

6. Clutch cover assembly according to claim 3, wherein said pressure plate features circumferentially spaced lugs projecting radially from its outside periphery to which are attached elastically deformable strips which link it rotationally to said cover and a sector forming part of said cover features a radial rim through which it bears on said reaction plate, said radial rim featuring a louver for a respective one of said lugs of said pressure plate to pass through and said overlap lug of said immediately adjacent sector overlapping and being attached to part of said louver.

7. Clutch cover assembly according to claim 6, wherein said overlap lug of each sector constitutes a cantilevered extension of said rim.

8. Clutch cover assembly according to claim 7, wherein at least one edge of said overlap lug of each sector is a flanged edge.

9. Clutch cover assembly according to claim 3, wherein each sector features a radial rim through which it bears on said reaction plate, said overlap lug of said immediately adjacent sector overlapping and being attached to part of said rim.

10. Clutch cover assembly according to claim 3, wherein each sector features a radial back part on which said axially acting elastic means bear, said overlap lug of said immediately adjacent sector overlapping and being attached to part of said back part.

11. Clutch cover assembly according to claim 2, wherein each sector has a generally axial part of which said overlap lug constitutes an extension.

12. Clutch cover assembly according to claim 2, wherein said overlap lug is in one piece with the sector of which it constitutes an extension.

13. Clutch cover assembly according to claim 2, further comprising, associated with each overlap lug superposed on and attached to a sector, at least one additional overlap lug operative between transverse parts of two sectors and bearing axially on one of said two sectors.

14. Method of assembling a clutch cover assembly comprising an annular cover adapted to be attached to a reaction plate, an annular pressure plate rotationally coupled to said cover and movable axially relative to said cover, and axially acting elastic means bearing on said cover and continuously urging said pressure plate away from said cover, wherein said cover is circumferentially divided into separate sectors and means are provided whereby said sectors overlap, in which method said sectors constituting said cover are individually moved radially nearer said pressure plate prior to final assembly of the clutch cover assembly.

* * * * *